US006856360B1

(12) United States Patent
Higuchi et al.

(10) Patent No.: US 6,856,360 B1
(45) Date of Patent: *Feb. 15, 2005

(54) ELECTROOPTICAL DEVICE, METHOD OF MANUFACTURING THE SAME, AND ELECTRONIC EQUIPMENT

(75) Inventors: Masayuki Higuchi, Kanagawa (JP); Satoshi Murakami, Kanagawa (JP); Misako Nakazawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/198,751

(22) Filed: Nov. 24, 1998

(30) Foreign Application Priority Data

Nov. 28, 1997 (JP) .............................................. 9-344403

(51) Int. Cl.[7] ........................ G02F 1/136; G02F 1/1335
(52) U.S. Cl. ......................... 349/43; 349/147; 349/110
(58) Field of Search ............................ 349/42–43, 138, 349/110, 147; 257/59, 72; 394/42, 43, 138, 152

(56) References Cited

U.S. PATENT DOCUMENTS

| 3,982,820 A | 9/1976 | Hattori et al. .............. 350/160 |
| 4,640,583 A | 2/1987 | Hoshikawa et al. ......... 350/343 |
| 4,796,979 A | 1/1989 | Tsuboyama ................. 350/350 |
| 4,861,622 A | 8/1989 | Yamazaki et al. |
| 4,911,958 A | 3/1990 | Mochizuki et al. ............ 428/1 |
| 4,932,757 A | 6/1990 | Hanyu et al. ............... 350/339 |
| 5,083,855 A | 1/1992 | Clark et al. ................... 359/72 |
| 5,117,299 A | 5/1992 | Kondo et al. ................. 359/58 |
| 5,132,676 A | 7/1992 | Kimura et al. .............. 340/784 |
| 5,148,259 A | 9/1992 | Kato et al. .................... 357/67 |
| 5,176,789 A | 1/1993 | Yamazaki et al. |

(List continued on next page.)

FOREIGN PATENT DOCUMENTS

| EP | 0 404 575 | 12/1990 |
| JP | 62-007022 | 1/1987 |
| JP | 63-198024 | 8/1988 |
| JP | 01-055527 | 3/1989 |

(List continued on next page.)

OTHER PUBLICATIONS

U.S. Appl. No. 09/064,176 (pending) filed Apr. 22, 1998, including specification, claims, drawings, PTO filing receipt, and Amendment.

(List continued on next page.)

Primary Examiner—Toan Ton
(74) Attorney, Agent, or Firm—Cook, Alex, McFarron, Manzo, Cummings & Mehler, Ltd.

(57) ABSTRACT

An AMLCD having high fineness and high contrast is realized. First, an interlayer film is provided on an element electrode, and an opening portion is formed in the interlayer film. Next, after a first metal layer is formed, an embedded insulating layer is formed. The embedded insulating layer is retreated by a means, such as an etch back method, to realize a state in which only the opening portion is filled with the embedded insulating layer. By this, electric connection between the element electrode and a second metal layer becomes possible while keeping the flatness.

21 Claims, 7 Drawing Sheets

U.S. PATENT DOCUMENTS

| | | | | |
|---|---|---|---|---|
| 5,189,540 A | | 2/1993 | Nakamura et al. | 359/102 |
| 5,212,575 A | | 5/1993 | Kojima et al. | 359/82 |
| 5,227,900 A | | 7/1993 | Inaba et al. | 359/56 |
| 5,240,801 A | | 8/1993 | Hayashi et al. | 430/57 |
| 5,250,465 A | | 10/1993 | Iizuka et al. | 437/173 |
| 5,250,931 A | * | 10/1993 | Misawa et al. | 345/206 |
| 5,270,846 A | | 12/1993 | Watanabe et al. | 359/74 |
| 5,305,126 A | | 4/1994 | Kobayashi et al. | 359/52 |
| 5,327,271 A | | 7/1994 | Takeuchi et al. | 359/75 |
| 5,330,616 A | | 7/1994 | Yamazaki | 156/643 |
| 5,332,521 A | | 7/1994 | Yuasa et al. | 252/299.01 |
| 5,339,306 A | | 8/1994 | Yoshinaga et al. | 369/275.01 |
| 5,354,497 A | | 10/1994 | Fukuchi et al. | 252/299.01 |
| 5,389,287 A | | 2/1995 | Nishiyama et al. | 252/299.01 |
| 5,391,258 A | | 2/1995 | Brancaleoni et al. | 156/636 |
| 5,412,493 A | * | 5/1995 | Kunii et al. | 349/43 |
| 5,412,494 A | | 5/1995 | Ishiwata et al. | 359/67 |
| 5,430,320 A | * | 7/1995 | Lee | 357/412 |
| 5,453,858 A | * | 9/1995 | Yamazaki | 349/42 |
| 5,469,281 A | | 11/1995 | Katakura et al. | 359/56 |
| 5,473,449 A | | 12/1995 | Takemura et al. | 359/56 |
| 5,473,450 A | | 12/1995 | Yamada et al. | 359/51 |
| 5,490,001 A | | 2/1996 | Konuma | 359/56 |
| 5,495,353 A | | 2/1996 | Yamazaki et al. | 359/54 |
| 5,500,750 A | * | 3/1996 | Kanbe et al. | 349/138 |
| 5,528,401 A | | 6/1996 | Narutaki et al. | 359/76 |
| 5,530,573 A | | 6/1996 | Shimada | 359/75 |
| 5,536,950 A | | 7/1996 | Liu et al. | 257/59 |
| 5,541,747 A | | 7/1996 | Nishi et al. | 359/56 |
| 5,546,208 A | | 8/1996 | Shimizu et al. | 359/81 |
| 5,552,913 A | | 9/1996 | Shimizu et al. | 359/80 |
| 5,562,529 A | | 10/1996 | Kishii et al. | 451/36 |
| 5,567,300 A | | 10/1996 | Datta et al. | 205/652 |
| 5,575,706 A | | 11/1996 | Tsai et al. | 451/41 |
| 5,583,369 A | | 12/1996 | Yamazaki et al. | 257/635 |
| 5,592,318 A | | 1/1997 | Majima et al. | 349/122 |
| 5,594,569 A | | 1/1997 | Konuma et al. | 349/122 |
| 5,616,934 A | | 4/1997 | Dennison et al. | 257/67 |
| 5,638,194 A | | 6/1997 | Yamada et al. | 349/86 |
| 5,643,826 A | | 7/1997 | Ohtani et al. | 437/88 |
| 5,644,370 A | | 7/1997 | Miyawaki et al. | 349/43 |
| 5,648,277 A | | 7/1997 | Zhang et al. | 437/21 |
| 5,652,667 A | | 7/1997 | Kurogane | |
| 5,658,806 A | | 8/1997 | Lin et al. | 438/157 |
| 5,706,064 A | | 1/1998 | Fukunaga et al. | 349/43 |
| 5,706,067 A | | 1/1998 | Colgan et al. | 349/114 |
| 5,717,224 A | | 2/1998 | Zhang | |
| 5,739,882 A | | 4/1998 | Shimizu et al. | 349/123 |
| 5,739,890 A | | 4/1998 | Uda et al. | 349/156 |
| 5,757,054 A | | 5/1998 | Miyawaki et al. | |
| 5,757,444 A | | 5/1998 | Takemura | |
| 5,767,827 A | | 6/1998 | Kobayashi et al. | 345/87 |
| 5,790,222 A | * | 8/1998 | Kim | 349/42 |
| 5,807,165 A | | 9/1998 | Uzoh et al. | 451/41 |
| 5,838,508 A | | 11/1998 | Sugawara | |
| 5,877,832 A | * | 3/1999 | Shimada | 349/138 |
| 5,899,547 A | | 5/1999 | Yamazaki et al. | |
| 5,905,555 A | | 5/1999 | Yamazaki et al. | |
| 5,907,376 A | * | 5/1999 | Shimada et al. | 349/138 |
| 5,910,271 A | | 6/1999 | Ohe et al. | 252/299 |
| 5,917,571 A | * | 6/1999 | Shimada | 349/138 |
| 5,933,204 A | | 8/1999 | Fukumoto | 349/43 |
| 5,933,205 A | | 8/1999 | Yamazaki et al. | |
| 5,946,059 A | | 8/1999 | Yamazaki et al. | |
| 5,946,561 A | | 8/1999 | Yamazaki et al. | 438/166 |
| 5,948,705 A | | 9/1999 | Jun | |
| 5,949,107 A | | 9/1999 | Zhang | 257/347 |
| 5,956,105 A | | 9/1999 | Yamazaki et al. | |
| 5,963,278 A | | 10/1999 | Yamazaki et al. | |
| 5,976,393 A | | 11/1999 | Abe | 216/18 |
| 5,990,491 A | | 11/1999 | Zhang | |
| 6,002,462 A | * | 12/1999 | Sato et al. | 349/106 |
| 6,005,648 A | | 12/1999 | Zhang et al. | |
| 6,008,876 A | | 12/1999 | Moore | 349/139 |
| 6,037,197 A | | 3/2000 | Yamazaki et al. | 438/151 |
| 6,043,149 A | | 3/2000 | Jun | 438/658 |
| 6,049,132 A | | 4/2000 | Iwahashi et al. | 257/763 |
| 6,081,305 A | | 6/2000 | Sato et al. | |
| 6,081,310 A | * | 6/2000 | Katsuya et al. | 349/113 |
| 6,097,453 A | | 8/2000 | Okita | |
| 6,221,140 B1 | | 4/2001 | Kobayashi et al. | 106/31.43 |
| 6,242,343 B1 | | 6/2001 | Yamazaki et al. | 438/633 |
| 6,400,428 B1 | | 6/2002 | Izumi | 349/73 |

FOREIGN PATENT DOCUMENTS

| | | |
|---|---|---|
| JP | 01-120532 | 5/1989 |
| JP | 02-137819 | 5/1990 |
| JP | 02-503360 | 10/1990 |
| JP | 04-136814 | 5/1992 |
| JP | 04-243228 | 8/1992 |
| JP | 04-362918 | 12/1992 |
| JP | 05-045636 | 2/1993 |
| JP | 05-297364 | 11/1993 |
| JP | 06-040931 | 5/1994 |
| JP | 06-160824 | 6/1994 |
| JP | 06-1160812 | 6/1994 |
| JP | 06-186533 | 7/1994 |
| JP | 06-214218 | 8/1994 |
| JP | 06-242409 | 9/1994 |
| JP | 06-289372 | 10/1994 |
| JP | 06-301015 | 10/1994 |
| JP | 06-301039 | 10/1994 |
| JP | 06-331948 | 12/1994 |
| JP | 06-337405 | 12/1994 |
| JP | 06-337418 | 12/1994 |
| JP | 06-347807 | 12/1994 |
| JP | 07-013143 | 1/1995 |
| JP | 07-130848 | 5/1995 |
| JP | 7-135318 | 5/1995 |
| JP | 8-015686 | 1/1996 |
| JP | 8-078329 | 3/1996 |
| JP | 09-211462 | 8/1997 |
| WO | WO 88/08552 | 11/1988 |

OTHER PUBLICATIONS

U.S. Appl. No. 09/197,767 (pending) to Ohtani et al., including PTO filing receipt, Amendment, specification, claims, abstract, and drawings.

U.S. Appl. No. 09/550,598 (pending) to Ohtani et al., including PTO replacement filing receipt, specification, claims, abstract, and drawings.

English abstract of Japanese Patent Application No. JP 8–078329, published Mar. 22, 1996.

English abstract of Japanese Patent Application No. JP 7–135318, published May 23, 1995.

English abstract of Japanese Patent Application No. JP 8–015686, published Jan. 19, 1996.

Chandani, A., et al, "Antiferroelectric Chiral Smectic Phases Responsible for the Tristable Switching in MHPOBC," Tokyo Institute of Technology, Dept. of Organic & Polymeric Materials, pp. 34–37, Jun. 12, (1989).

Shimizu, M. et al. "Characteristic of a Novel Liquid Crystal Cell with Mixture of FLC and U.V. Curable Resin," MO1. Cryst. Liq. Cryst., vol. 263, pp. 585–587, Jan. 1, 1995.

* cited by examiner

ETCH BACK PROCESS

Fig. 2B    PHOSPHORUS INTRODUCTION

Fig. 2C    CATALYST GETTERING

THERMAL OXIDATION STEP

P OR B ION INTRODUCTION

ETCH BACK PROCESS

ELECTROOPTICAL DEVICE, METHOD OF MANUFACTURING THE SAME, AND ELECTRONIC EQUIPMENT

BACKGROUND OF THE INVENTION

1. Field of the Invention

The present invention relates to an electrooptical device (particularly, a reflection type liquid crystal display device), and more particularly to a structure of each of a plurality of pixel electrodes provided in a pixel matrix circuit in the electrooptical device.

2. Description of the Related Art

In recent years, a technique for manufacturing a TFT on an inexpensive glass substrate has been rapidly developed. The reason is that the demand for an AMLCD (Active Matrix Liquid Crystal Display) has been increased.

In the AMLCD, a thin film transistor (TFT) as a switching element is disposed for each of several tens to several millions of pixels arranged in matrix, and an electric charge going in and out of each of pixel electrodes is controlled by a switching function of the TFT.

A liquid crystal is put between the respective pixel electrodes and an opposite electrode, and a kind of capacitor is formed. Thus, if an electric charge going in and out of the capacitor is controlled by the TFT, electrooptical characteristics of the liquid crystal are changed and light passing through a liquid crystal panel is controlled, so that picture display can be made.

As a phenomenon peculiar to a display device using such a liquid crystal, there is a phenomenon called disclination. Although the liquid crystal is arranged between the pixel electrode and the opposite electrode, with orientation having some regularity, there is a case where the orientation is disturbed by poor rubbing due to the asperities of the surface of the electrode. In this case, the function as a normal optical shutter is lost at that portion, and poor display, such as light leak, is caused.

Conventionally, although means, such as a structure of covering a TFT with a flattened film, have been contrived to prevent the disclination, the means do not necessarily become fundamental solutions. This is because even if a flattened film is used, it is impossible to flatten a difference in level at a contact portion of a finally formed pixel electrode.

SUMMARY OF THE INVENTION

The present invention has been made in view of the foregoing problems, and provides a technique relating to the structure of a contact portion to form a completely flat conductive layer. Particularly, an object of the present invention is to completely flatten a pixel electrode of an AMLCD and to prevent the occurrence of disclination caused from a difference in level at a contact portion. Then the area of a required black mask is decreased, so that an effective pixel area is enlarged and an AMLCD with high fineness and high contrast is realized.

According to an aspect of the present invention, an electrooptical device comprises a pixel matrix circuit constituted by a plurality of pixels each including at least one TFT and a pixel electrode connected to the TFT, and is characterized in that a contact portion for electrical connection to the TFT is formed at a part of the pixel electrode, and an insulating layer is embedded in a recess portion formed on the contact portion.

According to another aspect of the present invention, an electrooptical device comprises a pixel matrix circuit constituted by a plurality of pixels each including at least one TFT and a pixel electrode connected to the TFT, and is characterized in that the pixel electrode is made of a lamination structure of a first metal layer and a second metal layer, and an insulating layer is put between the first metal layer and the second metal layer at a contact portion where the first metal layer is connected to the TFT.

According to still another aspect of the present invention, an electrooptical device comprises a pixel matrix circuit constituted by a plurality of pixels each including at least one TFT and a pixel electrode connected to the TFT, and is characterized in that the pixel electrode is made of a lamination structure of a first metal layer and a second metal layer, an insulating film is embedded in a recess portion formed on the first metal layer, and the second metal layer is formed so as to cover the first metal layer and the insulating film.

In the above structure, the first and/or the second metal layer may be a single layer or a lamination.

The first metal layer may be made of a material selected from Ti (titanium), Cr (chromium), Ta (tantalum), W (tungsten), Mo (molybdenum), Nb (niobium) and Si (silicon).

Further, if the second metal layer is made of a material selected from Al (aluminum), Cu (copper), Ag (silver), and metal films mainly containing those elements, it is possible to form the pixel electrode having high reflectivity.

According to still another aspect of the present invention, a method of manufacturing an electrooptical device comprises the steps of: forming an opening portion in a first insulating layer; forming a first metal layer so as to cover the first insulating layer and the opening portion; forming a second insulating layer on the first metal layer; etching or polishing the second insulating layer to make a state where the second insulating layer is embedded in only a recess portion formed on the first metal layer; and forming a second metal layer so as to cover the first metal layer and the embedded second insulating layer.

According to still another aspect of the present invention, a method of manufacturing an electrooptical device comprises the steps of: forming an opening portion in a first insulating layer; forming a pixel electrode so as to cover the first insulating layer and the opening portion; forming a second insulating layer on the pixel electrode; and etching or polishing the second insulating layer to make a state where the second insulating layer is embedded in only a recess portion formed on the pixel electrode.

BRIEF DESCRIPTION OF THE DRAWINGS

In the accompanying drawing;

FIGS. 2A to 2D are views showing manufacturing steps of a pixel matrix circuit;

DETAILED DESCRIPTION OF THE INVENTION

Figure 1A:
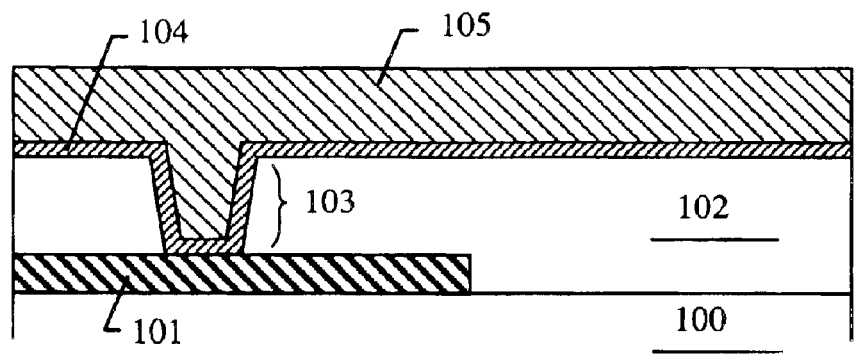
FIGS. 1A to 1C are views showing formation of a connection structure of a pixel electrode.

The best mode of carrying out the present invention will be described with reference to FIGS. 1A to 1C. In FIG. 1A, reference numeral 100 denotes an under film, which may be any of an insulating layer, a semiconductor layer, and a conductive layer. An element electrode (electrode forming a part of a TFT) 101 is patterned on the under film. The element electrode 101 is covered with an interlayer film (interlayer insulating layer) 102. A single layer or a lamination layer selected from insulating films containing silicon, such as a silicon oxide film, a silicon nitride film, or a silicon nitride oxide film, and an organic resin film is used as the interlayer film 102. Here, an explanation will be given to a case, as an example, where a single layer of an organic resin film is provided.

After the interlayer film 102 is formed, an opening portion (contact hole) 103 is formed by etching. As a method of etching, both a wet etching method and a dry etching method may be used. It is also effective to improve the coverage of a next formed thin film by making a sectional shape of the opening portion 103 taper-shaped. The tapered configuration may be achieved by simultaneously etching a photoresist mask during an isotropic etching of the contact hole.

After the opening portion 103 is formed in this way, a first metal layer 104 is formed. A material selected from Ti (titanium), Cr (chromium), Ta (tantalum), W (tungsten), Mo (molybdenum), Nb (niobium) and Si (silicon) is used as the metal layer 104. Of course, the first metal layer may be a single layer or a lamination layer. The metal layer serves to make electrical connection with the element electrode 101.

After the first metal layer 104 is formed, an embedded insulating layer 105 is formed. An organic resin film or an inorganic film is used as the embedded insulating layer 105.

As the organic resin film, a kind of or plural kinds of materials selected from polyimide, polyamide, polyimide amide, and acryl may be used. Since the films of those materials are formed by a spin coating method, they have merits that covering properties are excellent and the film thickness can be easily made thick.

As the inorganic film, it is possible to use a silicon oxide film, a silicon nitride film, a silicon nitride oxide film, or the like. More preferably, it is appropriate to use a solution coating type material called SOG (Spin On Glass).

As such a solution coating type material, OCD (Ohka Coating Diffusion source) made by Tokyo Ohka Industries, Co., Ltd., general silicate glass (PSG, BSG, BPSG), and the like can be enumerated. Since these solution coating type materials are also formed by the spin coating method, the same merits as the organic resin film can be obtained.

After the embedded insulating layer 105 is formed by the spin coating method, a curing step is carried out as the need arises so that a surplus solvent is evaporated and the film quality is improved. Although there are various conditions for the curing step, baking (heat treatment) to a degree of 300° C. and 30 min is necessary.

As another merit of the solution coating type material, it is possible to cite a feature that coloring is easy. For example, an organic resin film blackened by dispersing a carbon-based material has been used as a black mask. That is, in the present invention, it is also possible to prevent light leak at a contact portion by the embedded insulating layer.

When the embedded insulating layer 105 is formed, the state of FIG. 1A is obtained. After this state is obtained, the embedded insulating layer 105 is subjected to an etch back process by a dry etching method so that an embedded insulating layer 106, which fills only a recess portion formed on the first metal layer 104 through the opening portion 103, is formed (FIG. 1B).

In this etch back step, it is necessary to pay attention to overetching of the embedded insulating layer 105. That is, in this step, the etch back must be completed at the time when the first metal layer 104 is completely exposed in a region other than a contact portion 108 so that the surface of the insulating layer 106 is flush with the surface of the first metal layer 104. If excessive overetching is carried out, the embedded insulating layer 106 in the opening portion is dug so that a difference in level is produced.

It is also necessary to pay attention to etching conditions. Since the etch back step is carried out by plasma etching, according to etching conditions, the surface of the first metal layer 104 is roughened. This causes disadvantages, for example, a pixel electrode becomes clouded, so that this is not preferable. Since the optimum conditions of the plasma etching become different according to the film quality of the first insulating layer and the embedded insulating layer, it is appropriate that a user suitably determines the conditions.

It is important to use the spin coating method in the formation of the embedded insulating layer 105 on the point that the film thickness can be easily made thick. In FIG. 1A, the thickness of the embedded insulating layer 105 must be made at least comparable with the thickness of the interlayer film 102 or more than that. Thus, it is possible to realize a throughput much higher than that in the formation by a CVD method or a sputtering method.

Figure 1B:
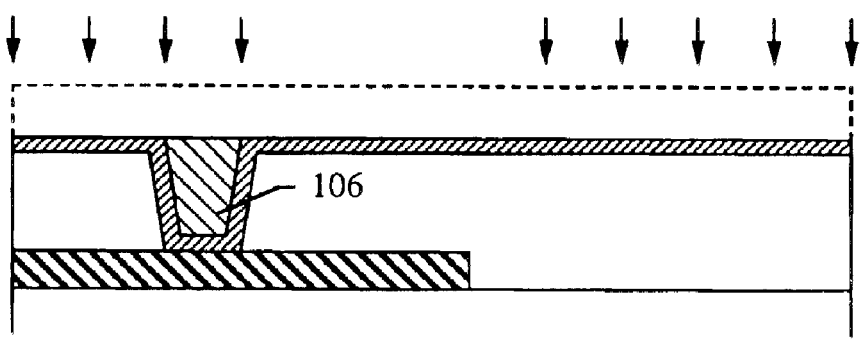
Figure 1C:
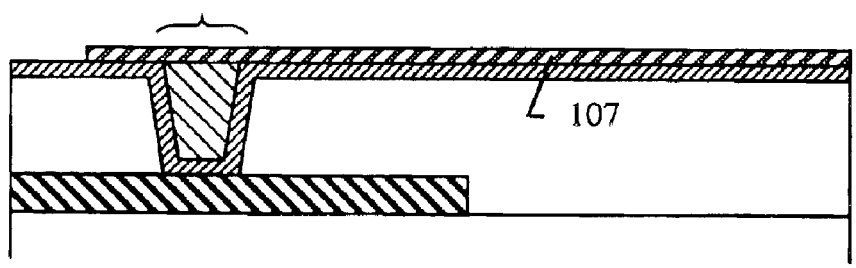

After the state of FIG. 1B is obtained in this way, a second metal layer 107 is formed so as to cover the first metal layer 104 and the embedded insulating layer 106, and is patterned. In this way, the element electrode 101 is electrically connected to the second metal layer 107 (FIG. 1C).

In the contact portion 108, the recess portion formed on the first metal layer 104 is filled with the embedded insulating layer 106. Thus, the second metal layer 107 can completely secure the flatness even at the contact portion 108.

With respect to the present invention having the structure described above, the detailed description will be given with embodiments set forth below.

[Embodiment 1]

In this embodiment, a method of manufacturing a unit pixel (unit picture element) constituting a pixel matrix circuit of an active matrix type liquid crystal display device driven in a reflection mode will be described with reference to FIGS. 2A to 2D.

First, a quartz substrate 201 as a substrate having an insulating surface is prepared. In this embodiment, since a heat treatment at 900 to 1100° C. is carried out later, it is necessary to use a material having high heat resistance. Other than the quartz substrate, a crystallized glass (glass ceramic) substrate provided with an under film, a silicon substrate provided with a thermal oxidation film, or the like may be used.

An amorphous silicon film 202 with a thickness of 65 nm is formed thereon, and the amorphous silicon film 202 is crystallized by using a technique disclosed in Japanese Patent Unexamined Publication No. Hei. 8-78329. The technique of the publication is the one for carrying out selective crystallization by using a catalytic element for facilitating crystallization. In an alternative, methods disclosed in U.S. patent application Ser. No. 08/329,644 (which is issued as U.S. Pat. No. 5,643,826) may be used. The entire disclosure of these patents are incorporated herein by reference.

Here, a mask insulating film 203 is formed to selectively add a catalytic element (in this embodiment, nickel) to the amorphous silicon film 202. An opening portion 204 is provided in the mask insulating film 203.

Then a nickel acetate solution containing nickel of 10 ppm in weight is applied by a spin coating method to form a catalytic element containing layer 205.

Figure 2A:
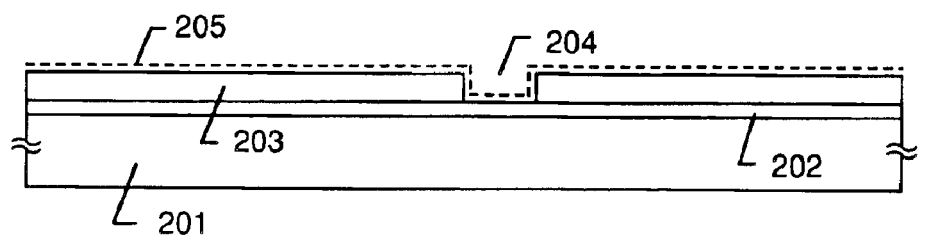
Figure 2A:
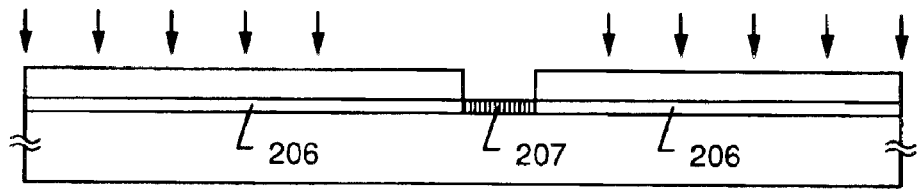
Figure 2A:
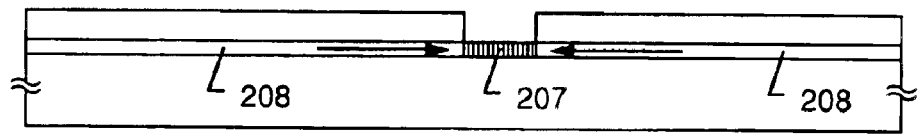

After the state of FIG. 2A is obtained in this way, a dehydrogenating step at 450° C. for one hour is carried out, and then, a heat treatment at 570° C. for 14 hours is carried out in a nitrogen atmosphere, so that lateral growth regions 206 are obtained. When the crystallizing step is ended in this way, an adding step of phosphorus is carried out by directly using the mask insulating film 203 as a mask. A phosphorus added region 207 is formed by this step.

After the state of FIG. 2B is obtained in this way, a heat treatment at 600° C. for 12 hours is carried out, so that nickel remaining in the lateral growth regions 206 is gettered into the phosphorus added region 207. In this way, regions (called gettered regions) 208 in which nickel concentration is lowered to $5 \times 10^{17}$ atoms/cm$^3$ or less, are obtained (FIG. 2C).

Next, active layers 209 and 210 made of only the gettered regions 208 are formed by patterning. Then a gate insulting film 211 with a thickness of 120 nm is formed. The gate insulating film 211 is made of a silicon oxide film, a silicon nitride film, a silicon nitride oxide film, or a lamination film of those.

After the gate insulating film 211 is formed in this way, a heat treatment at 950° C. for 30 minutes is carried out in an oxygen atmosphere, so that a thermal oxidation film is formed at an interface between the active layer and the gate insulating film. By doing so, the interfacial characteristics can be greatly improved.

Figure 2D:
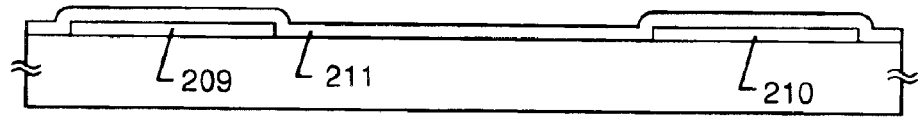

In the thermal oxidation step, the active layers 209 and 210 are 14 oxidized and are thinned. In this embodiment, adjustment is made so that the final thickness of the active layer becomes 50 nm. That is, since the thickness of the starting film (amorphous silicon film) is 65 nm, oxidation of a film with a thickness of 15 nm is carried out and a thermal oxidation film with a thickness of 30 nm is formed (the total thickness of the gate insulating film becomes 150 nm) (FIG. 2D).

Next, an aluminum film (not shown) containing scandium of 0.2 wt % is formed, and an island-like pattern as an original of a gate electrode is formed by patterning. When the island-like pattern is formed, a technique disclosed in Japanese Patent Unexamined Publication No. Hei. 7-135318 is used. An entire disclosure of U.S. Pat. No. 5,648,277 which corresponds to this Japanese patent is incorporated herein by reference.

First, anodic oxidation is carried out in an oxalic acid while a resist mask used in the patterning remains on the above island-like pattern. At this time, a forming current of 2 to 3 mV is flown with a platinum electrode as a cathode, and a reached voltage is made 8 V. In this way, porous anodic oxidation films 212 and 213 are formed.

Thereafter, after the resist mask is removed, anodic oxidation is carried out in a solution obtained by neutralizing an ethylene glycol solution containing tartaric acid of 3% with ammonia water. At this time, it is appropriate that a forming current is made 5 to 6 mV, and a reached voltage is made 100 V. In this way, dense nonporous anodic oxidation films 214 and 215 are formed.

Figure 3A:
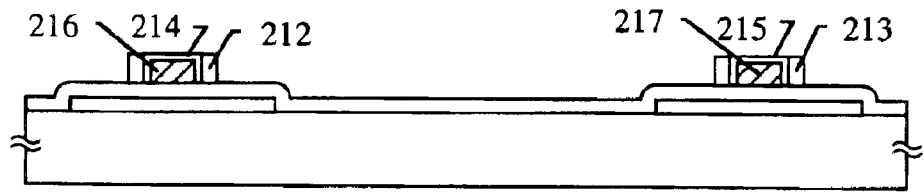
FIGS. 3A to 3D are views showing manufacturing steps of the pixel matrix circuit.

Gate electrodes 216 and 217 are defined by the above step. In the pixel matrix circuit, a gate line for connecting each gate electrode is also formed for every line at the same time as the formation of the gate electrode (FIG. 3A).

Next, the gate insulating film 211 is etched with the gate electrodes 216 and 217 as masks. The etching is carried out by a dry etching method using a $CF_4$ gas. By this, gate insulating films having shapes as indicated by 218 and 219 are formed.

In this state, an impurity ion to give one conductivity is added by an ion implantation method or a plasma doping method. In this case, if the pixel matrix circuit is constituted by N-type TFTs, it is appropriate that a P (phosphorus) ion is added, and if the pixel matrix circuit is constituted by P-type TFTs, it is appropriate that a B (boron) ion is added.

Incidentally, the above impurity ion adding step is divided into two steps and is carried out twice. The first adding step is carried out with a high acceleration voltage of about 80 keV, and adjustment is made so that the peak of impurity ions comes to a portion under the end (protruding portion) of each of the gate insulating films 218 and 219. The second step is carried out with a low acceleration voltage of about 5 keV, and adjustment is made so that impurity ions are not added to the portion under the end (protruding portion) of each of the gate insulating films 218 and 219.

Figure 3B:

In this way, source regions 220 and 221, drain regions 222 and 223, low concentration impurity regions (also called LDD regions) 224 and 225, and channel formation regions 226 and 227 are formed (FIG. 3B).

At this time, it is preferable to add impurity ions to the source/drain regions to such a degree that the sheet resistance thereof becomes 300 to 500 Ω/square. It is necessary to optimize the low concentration impurity region according to the performance of a TFT. After the adding step of impurity ions is ended, a heat treatment is carried out to activate the impurity ions.

Next, a silicon oxide film with a thickness of 400 nm is formed as a first interlayer insulating film 228, and source electrodes 229 and 230, and drain electrodes 231 and 232 are formed thereon. In this embodiment, the drain electrode 228 is formed to extend in a pixel.

This is a contrivance for securing capacity as large as possible since the drain electrode is used as a lower electrode of an auxiliary capacitance. Since this embodiment is an example of a reflection type, even the portion under the region where a pixel electrode is subsequently disposed can also be used freely without paying attention to an opening rate.

Figure 3C:
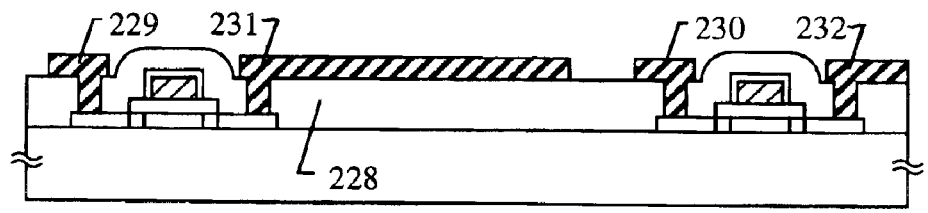

After the state of FIG. 3C is obtained in this way, a silicon nitride film 233 with a thickness of 50 nm is formed so as to cover the source/drain electrodes. Then a titanium film 234 as a capacitance electrode is formed thereon. In this embodiment, the auxiliary capacitance is formed between the drain electrode 231 and the capacitance electrode 234 with the silicon nitride film 233 as a dielectric.

Next, an acrylic resin film with a thickness of 1 μm is formed as a second interlayer insulating film 235. Of course, an organic resin film of polyimide or the like other than acryl may be used. A black mask 236 is formed on the second interlayer insulating film 235.

The black mask 236 has also a function as an electric field shielding film other than a function as a black mask. That is, the black mask has the effect to prevent an electric field produced from source/drain wiring lines from affecting a subsequently formed pixel electrode.

Figure 3D:
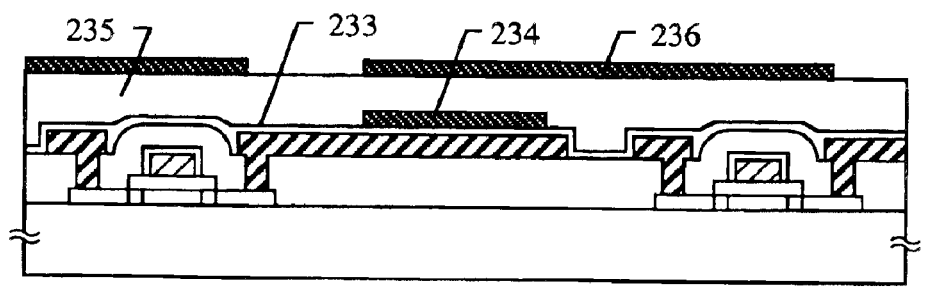

After the state of FIG. 3D is obtained in this way, an acrylic resin film with a thickness of 1 μm is again formed as a third interlayer insulating film 237, and opening portions 238 and 239 are formed therein. Then a titanium film (first metal layer) 240 is formed so as to cover the third interlayer insulating film 237 and the opening portions 238 and 239.

Other than the titanium film, a material selected from chromium, tantalum, tungsten, molybdenum, niobium, and silicon (provided that conductivity is given to silicon) may be used. Moreover, a lamination structure of materials selected from those elements may be used.

Figure 4A:
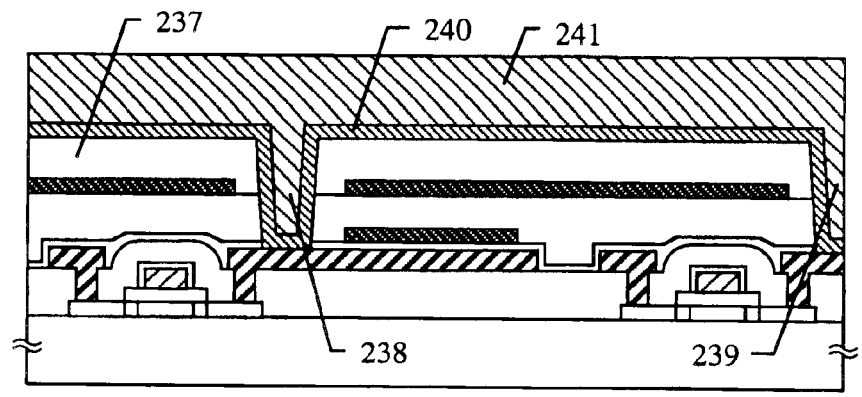
FIGS. 4A to 4C are views showing manufacturing steps of the pixel matrix circuit.

Next, after the titanium film 240 is formed, an acrylic resin film 241 with a thickness of 2 μm is formed as an embedded insulating layer. At this time, since the acrylic resin film 241 is formed by a spin coating method, it is possible to sufficiently cover the inside of recess portions formed on the first metal layer 240 through the opening portions 238 and 239 (FIG. 4A).

Figure 4B:
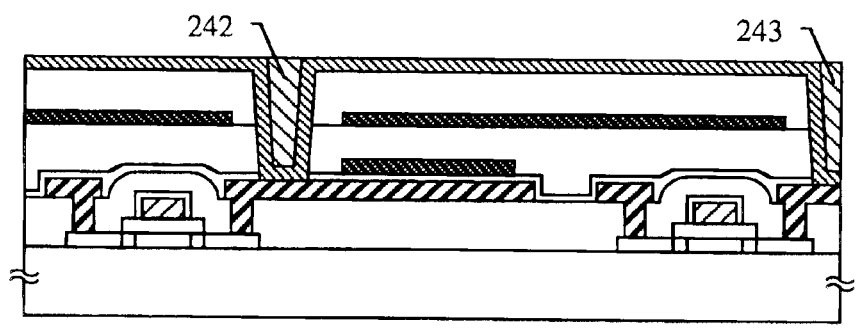
Figure 4C:
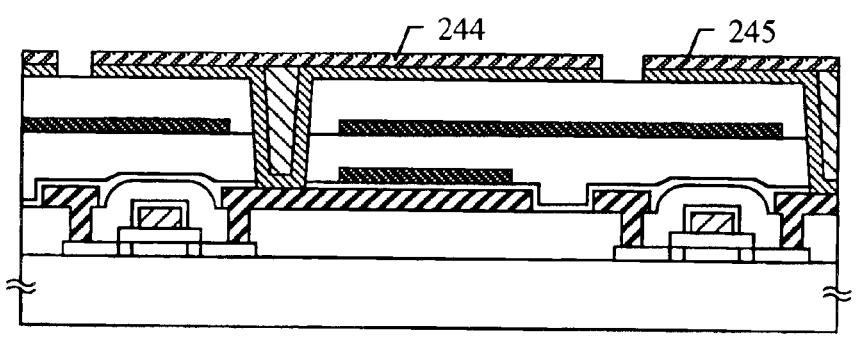

Next, an etch back process is carried out by a dry etching method using an oxygen gas to etch the acrylic resin film 241. Then a state in which the opening portions 238 and 239 are filled with insulating layers 242 and 243 is realized (FIG. 4B).

A material (second metal layer) containing aluminum as its main ingredient and having a thickness of 400 nm is formed on the titanium film 240 which is completely flattened by the embedded insulating layers 242 and 243, and is patterned, so that pixel electrodes 244 and 245 are formed.

At this time, the titanium film 240 is also patterned continuously. By doing so, the respective pixel electrodes can be physically insulated from each other. Although a difference in level, corresponding to the thickness of the two-layered metal layer, occurs at the patterning end, if the difference is disposed over the source electrode 229 or 230, it is eventually shaded with the black mask, so that the difference does not cause any problem. Indeed, since the generating position of disclination can be fixed to this place, the occurrence of the difference is advantageous.

In the case where the pixel electrodes are formed in the structure as described above, since the insides of the opening portions 238 and 239 are filled with the embedded insulating layers 242 and 243, the pixel electrodes 244 and 245 can be electrically connected to the drain electrodes while the flatness of the pixel electrodes is secured. In this embodiment, although the material containing aluminum as its main ingredient is used for the pixel electrode, it is also possible to use copper, silver, or a material containing those as its main ingredient. Other material can be used for the pixel electrode as long as the material has a high reflectivity.

It is also acceptable to make such a structure that another conductive film (titanium, chromium, tantalum, etc.) is laminated as an under layer of the pixel electrode having such high reflectivity. Since a material, such as aluminum, copper, or silver, has a high reactivity, there is also a case in which it is better to provide an under film, such as a titanium film, to make an ohmic contact with another conductive film (especially, a silicon film).

The feature of this embodiment exists in that since a difference in level does not occur on the pixel electrodes 244 and 245 at the contact portions, the whole surface of the pixel electrode can be effectively used. That is, the effective pixel area is enlarged so that a utilization efficiency of light is greatly improved.

After the pixel electrodes 244 and 245 are formed in this way, when an orientation film (not shown) is formed thereon, an active matrix substrate as one of substrates of a liquid crystal display device is completed. Thereafter, an opposite substrate is prepared by a well-known means, and a cell assembling step is performed, so that the active matrix liquid crystal display device is completed.

The thus completed active matrix liquid crystal display device has high brightness while having high fineness, and picture display having high contrast can be made.

[Embodiment 2]

In the embodiment 1, although the etch back treatment is carried out to the embedded conductive layer so that filling of the opening portion is carried out, it is also possible to carry out a polishing treatment instead of the etch back treatment. Typically, it is also by possible to adopt a technique called CMP (Chemical Mechanical Polishing).

In the case where this technique is used, although it is necessary to pay attention to the occurrence of dust, if this technique is used, there is no fear of excess overetching in the opening portion. Moreover, since to the first metal layer can function as a polishing stopper, excellent flatness can be realized.

[Embodiment 3]

Figure 5A:
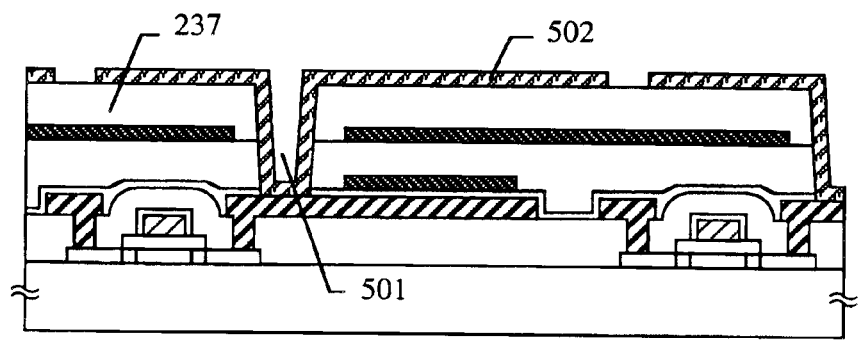
FIGS. 5A to 5C are views showing manufacturing steps of a pixel matrix circuit.
Figure 5B:
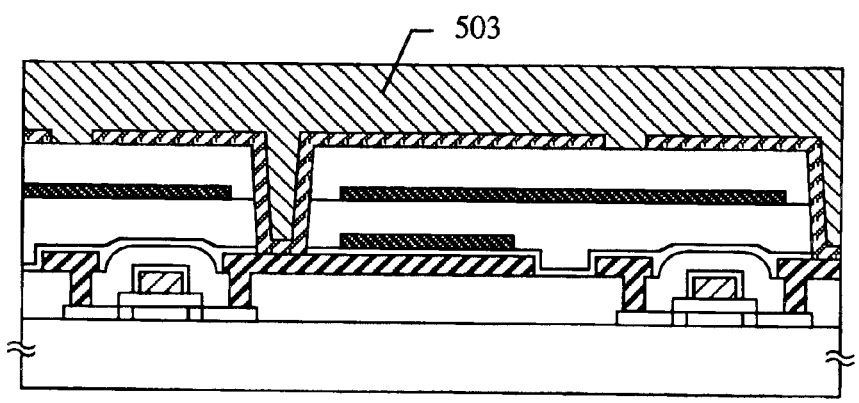
Figure 5C:
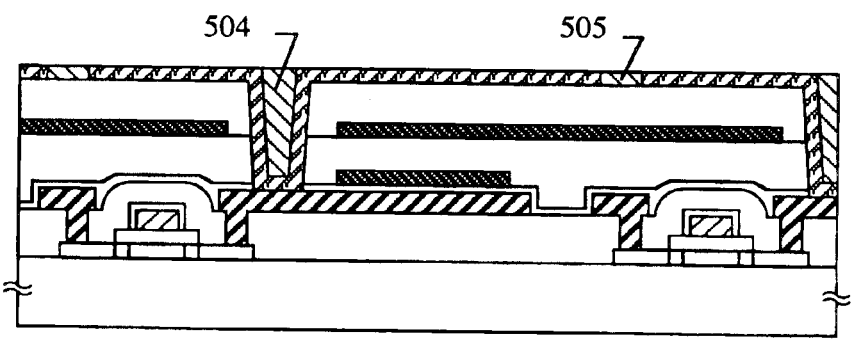

In this embodiment, a technique for manufacturing a reflection type AMLCD by a structure different from the embodiment 1 will be described with reference to FIGS. 5A to 5C.

First, in accordance with the manufacturing steps of the embodiment 1, a third interlayer insulating film 237 is formed, and an opening portion 501 is formed. Then a pixel electrode 502 is formed so as to cover the third interlayer insulating film 237 and the opening portion 501 (FIG. 5A).

Next, an embedded insulating layer 502 having a thickness of 2 μm is formed so as to cover the pixel electrode 502. In this embodiment, a polyimide resin film is used as the embedded insulating layer (FIG. 5B).

Next, the embedded insulating layer 503 is made to retreat (the thickness is made thin), so that an embedded insulating layer 504 is formed in a recess portion formed on the pixel electrode 502 through the opening portion 501. At the same time, an embedded insulating layer 505 is formed in a gap between adjacent pixel electrodes. In this way, the flat surface as shown in FIG. 5C is obtained.

If a pigment or carbon-based material (graphite or the like) is dispersed in the embedded insulating layer 503 in advance, it is possible to color the embedded insulating layers 504 and 505 black.

If the embedded insulating layers 504 and 505 are made light absorbing layers by dispersing fine particles for coloring in this way, it is possible to prevent diffused reflection of light at the recess portion, so that a liquid crystal display device having high contrast can be in manufactured.

Incidentally, it is also possible to carry out the embodiment 2 with respect to this embodiment.

[Embodiment 4]

In the embodiments 1 to 3, although the explanation has been given with a top gate structure (here, planar type) TFT as an example, even if a bottom gate structure (typically, reverse stagger type) TFT is used instead of the top gate structure, similar effects can be obtained.

Moreover, the present invention can be applied to not only the TFT but also to the case where a MOSFET formed on a single crystal silicon wafer is used as a pixel switching element.

As described above, the present invention can be applied to a device of any structure as long as the device is an electrooptical device having a pixel electrode. For example, it is possible to use a switching element of a bottom gate structure and a multi-gate structure in which two thin film transistors are connected to a pixel electrode. Moreover, it is possible to provide an LDD structure a GOLD (gate overlapped light drain) structure to the switching element.

[Embodiment 5]

In the electrooptical device set forth in the embodiments 1 to 4, it is also possible to raise reflectivity by coating the surface of a pixel electrode with an electrolytic plating.

For example, after a pixel electrode is formed of a material containing aluminum as its main ingredient, anodic oxidation is carried out to form a porous anodic oxidation film on the surface of the electrode. By doing so, the adhesiveness of the plating is raised and the !: pixel electrode having very high reflectivity can be realized. As a plating material, it is preferable to use silver having high reflectivity.

If this embodiment is carried out, the kinds of metal films which can be used as pixel electrodes are also greatly increased, and a process margin is also widened. Moreover, a pixel electrode effectively using the reflectivity of silver can be formed at manufacturing cost less expensive than the case of using a silver electrode.

[Embodiment 6]

In the embodiments 1 to 5, the explanation has been given with an AMLCD driven in a reflection mode as an example, it is also possible to apply the present invention to an AMLCD driven in a transmission mode. In that case, it is satisfactory if a light transmission window is first secured by changing the arrangement of an auxiliary capacitance and the arrangement of a black mask, and a pixel electrode is made a transparent conductive film (typically ITO).

In the case where a transmission type LCD is manufactured, if a pixel electrode (transparent conductive film) is made to be directly connected to an active layer, light leak from a contact portion can become a problem. Even in such a case, if an embedded insulating layer is colored so that it has light absorbing properties, the light leak can be effectively prevented.

[Embodiment 7]

Figure 6A:
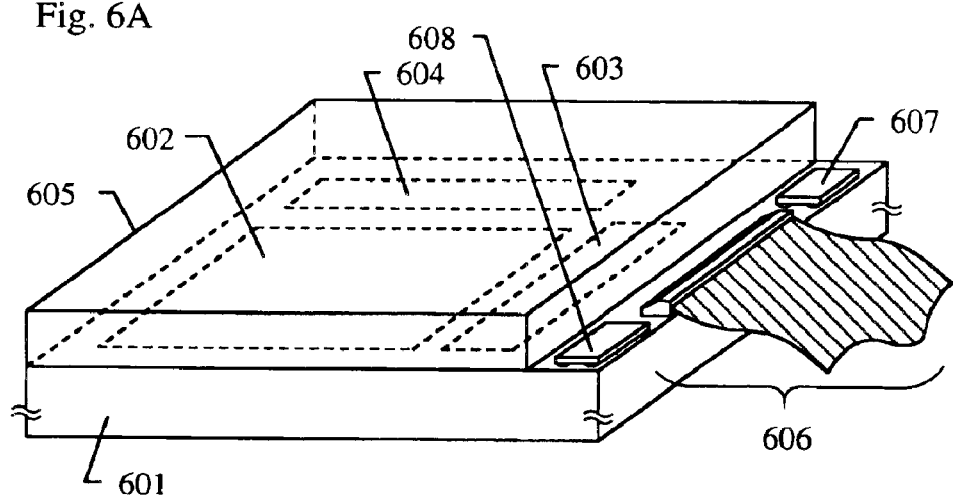
FIGS. 6A and 6B are views each showing an electrooptical device.
Figure 6B:
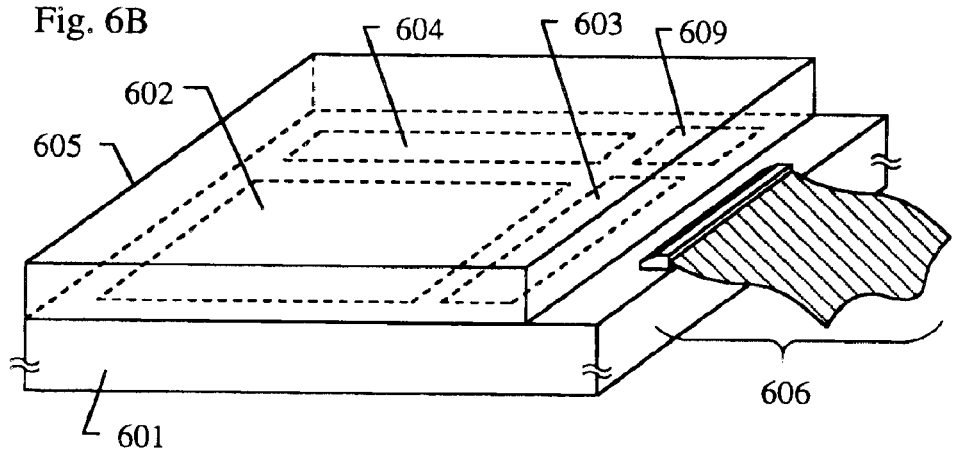

In this embodiment, an example in which an AMLCD is constructed by using an active matrix substrate (element formation side substrate) having a structure shown in the embodiments 1 to 6, will be described. FIGS. 6A and 6B respectively show the outer appearance of the AMLCD of this embodiment.

In FIG. 6A, reference numeral 601 denotes an active matrix substrate on which a pixel matrix circuit 602, a source side driving circuit 603, and a gate side driving circuit 604 are formed. It is preferable that the driving circuit is made of a CMOS circuit in which an N-type TFT and a P-type TFT are complementarily combined. Reference numeral 605 denotes an opposite substrate.

In the AMLCD shown in FIG. 6A, the active matrix substrate 601 and the opposite substrate 605 are bonded to each other in such a manner that their respective end faces are flush with each other. However, only some part of the opposite substrate 605 is removed, and an FPC (Flexible Print Circuit) 606 is connected to an exposed portion of the active matrix substrate. An external signal is transmitted to the inside of the circuit through this FPC 606.

Moreover, IC chips 607 and 608 are attached by using the surface where the FPC is attached. These IC chips are structured by forming various circuits, such as a processing circuit of a video signal, a timing pulse generating circuit, a γ correction circuit, a memory circuit, and an arithmetic circuit, on a silicon substrate. Although two IC chips are attached in FIG. 6A, only one chip or more than two chips may be attached.

The structure as shown in FIG. 6B can also be adopted. In FIG. 6B, the same portions as those of FIG. 6A are denoted by the same reference numerals. FIG. 6B shows an example in which signal processing carried out by the IC chips is carried out by a logic circuit 609 made of TFTs on the same substrate. In this case, the logic circuit 609 is also made of a CMOS circuit as a base like the driving circuits 603 and 604.

Although the AMLCD of this embodiment adopts the structure (BM on TFT) in which a black mask is provided on the active matrix substrate, in addition to that, it is also possible to make such a structure that a black mask is provided on the opposite side.

Color display may be made by using a color filter, or a structure not using a color filter may be adopted by driving a liquid crystal in an ECB (Electric field Control Birefringence) mode, GH (Guest Host) mode, or the like.

Like a technique disclosed in Japanese Patent Unexamined Publication No. Hei. 8-15686, a structure using a microlens array may be adopted. An entire disclosure of this patent is incorporated herein by reference.

[Embodiment 8]

The AMLCD with the structure shown in the embodiments 1 to 7 can be used for a display of various electronic equipments. As such electronic equipments, a video camera, a still camera, a projector, a projection TV, a head mount display, a car navigation system, a personal computer (including a note-sized computer), a portable information terminal (mobile computer, portable telephone, etc.), and the like are enumerated. An example of those is shown in each of FIGS. 7A to 7F.

Figure 7A:
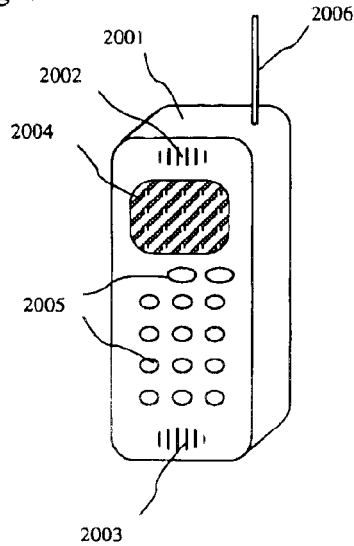
FIGS. 7A to 7F are views each showing the structure of an electronic equipment.

FIG. 7A shows a portable telephone which is constituted by a main body 2001, an audio output portion 2002, an audio input portion 2003, a display device 2004, an operation switch 2005, and an antenna 2006. The present invention can be applied to the display device 2004 and the like.

Figure 7B:
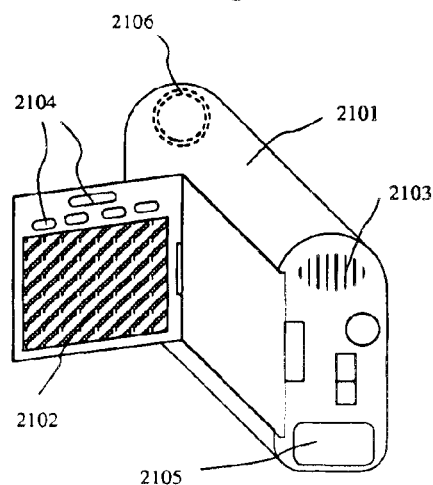

FIG. 7B shows a video camera which is constituted by a main body 2101, a display device 2102, an audio input portion 2103, an operation switch 2104, a battery 2105, and an image receiving portion 2106. The present invention can be applied to the display device 2102.

Figure 7C:
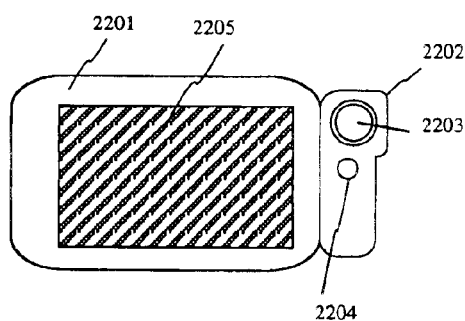

FIG. 7C shows a mobile computer which is constituted by a main body 2201, a camera portion 2202, an image receiving portion 2203, an operation switch 2204, and a display device 2205. The present invention can be applied to the display device 2205 and the like.

Figure 7D:
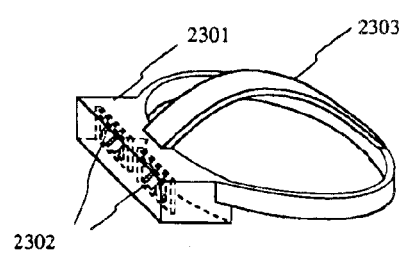

FIG. 7D shows a head mount display which is constituted by a main body 2301, a display device 2302, and a band portion 2303. The present invention can be applied to the display device 2302.

Figure 7E:
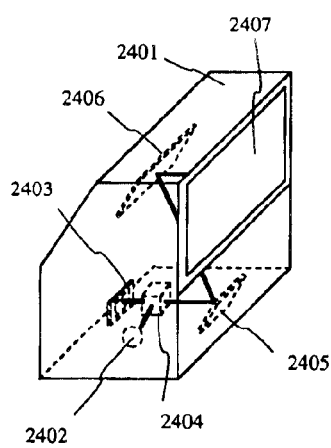

FIG. 7E shows a rear type projector which is constituted by a main body 2401, a light source 2402, a display device 2403, a polarizing beam splitter 2404, reflectors 2405 and 2406, and a screen 2407. The present invention can be applied to the display device 2403.

Figure 7F:
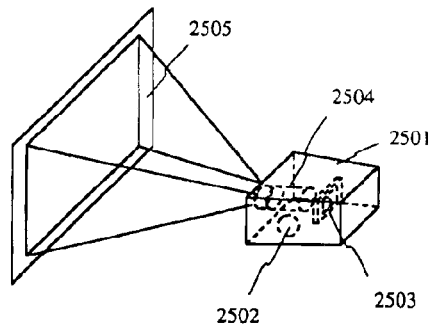

FIG. 7F shows a front type projector which is constituted by a main body 2501, a light source 2502, a display device 2503, an optical system 2504, and a screen 2505. The present invention can be applied to the display device 2503.

As described above, the scope of application of the present invention is very wide, and the present invention can be applied to electronic equipments of any field. Moreover, the present invention can also be effectively used for a video billboard, a display for advertisement, and the like.

By carrying out the present invention, it becomes possible to form a completely flat pixel electrode, and as a result, disclination due to a contact portion (recess portion) of the pixel electrode can be prevented. Thus, an effective display region is greatly enlarged, and it becomes possible to realize an electrooptical device of higher fineness with high contrast.

What is claimed is:

1. A display device comprising a pixel matrix circuit comprising a plurality of pixels each including at least one TFT and a pixel electrode connected to the TFT, wherein the pixel electrode includes a lamination structure of a first metal layer and a second metal layer;

wherein the first metal layer is in contact with the second metal layer, an insulating layer is put between the first metal layer and the second metal layer at a contact portion where the first metal layer is connected with the TFT, and wherein the insulating layer comprises a light absorbing layer comprising a resin in which a pigment or a carbon-based material is contained.

2. A display device according to claim 1, wherein at least one of the first and the second metal layer has a single layer structure or a lamination structure.

3. A display device according to claim 1, wherein the first metal layer is made of a material selected from the group consisting of Ti, Cr, Ta, W, Mo, Nb and Si, and the second metal layer is made of a material selected from the group consisting of Al, Cu, Ag, and metal films mainly containing those elements.

4. A display device according to claim 1, wherein the insulating layer is an organic resin film of at least one material selected from the group consisting of polyimide, polyamide, polyimide amide, and acryl.

5. An electronic equipment comprising a display device according to claim 1, as a display.

6. A display device according to claim 1 wherein said device is a portable telephone.

7. A display device according to claim 1 wherein said device is a video camera.

8. A display device according to claim 1 wherein said device is a mobile computer.

9. A display device according to claim 1 wherein said device is a rear projector.

10. A display device according to claim 1 wherein said device is a front projector.

11. A display device comprising a pixel matrix circuit comprising:

a TFT;

a first insulating layer over the TFT, wherein the first insulating layer comprises a contact hole;

a first conductive film over the first insulating film and in the contact hole, wherein the first conductive film is electrically connected to the TFT through the contact hole;

a second insulating layer filled in the contact hole, wherein an upper surface of the first conductive film outside the contact hole is not covered by the second insulating layer;

a second conductive film on and in contact with the upper surface of the first conductive film and the second insulating layer, wherein the second insulating layer comprises a light absorbing layer comprising a resin in which a pigment or a carbon-based material is contained.

12. A display device according to claim 11, wherein at least one of the first and the second metal layer has a single layer structure or a lamination structure.

13. A display device according to claim 11, wherein the first metal layer is made of a material selected from the group consisting of Ti, Cr, Ta, W, Mo, Nb, and Si, and the second metal layer is made of a material selected from the group consisting of Al, Cu, Ag, and metal films mainly containing those elements.

14. A display device according to claim 11, wherein the insulating layer is an organic resin film of at least one material selected from the group consisting of polyamide, polyamide, polyimide amide, and acryl.

15. An electronic equipment comprising a display device according to claim 11, as a display.

16. A display device according to claim 11 wherein said device is a portable telephone.

17. A display device according to claim 11 wherein said device is a video camera.

18. A display device according to claim 11 wherein said device is a mobile computer.

19. A display device according to claim 11 wherein said device is a rear projector.

20. A display device according to claim 11 wherein said device is a front projector.

21. A display device according to claim 11, wherein the first conductive film is electrically connected to the TFT through one of a source electrode and a drain electrode thereof.

* * * * *